United States Patent [19]

Lane et al.

[11] 4,170,729
[45] Oct. 9, 1979

[54] CONTROL SYSTEMS FOR OR IN ASSOCIATION WITH STORAGE HEATERS

[75] Inventors: Richard J. Lane, Moddershall; Gordon Ellis, Stramshall, both of England

[73] Assignee: Creda Electric Limited, Stoke-on-Trent, England

[21] Appl. No.: 655,256

[22] Filed: Feb. 4, 1976

[30] Foreign Application Priority Data

Feb. 11, 1975 [GB] United Kingdom ............... 5697/75

[51] Int. Cl.² ..................... H05B 1/02; F24H 7/02
[52] U.S. Cl. ......................... 219/364; 219/365; 219/378; 219/492; 219/497; 219/504; 219/508
[58] Field of Search .............. 219/364, 365, 378, 326, 219/325, 341, 508, 492, 494, 496, 504, 497, 490; 165/18; 126/400

[56] References Cited

U.S. PATENT DOCUMENTS

| 3,584,291 | 6/1971 | Budniak | 219/494 |
| 3,814,902 | 6/1974 | Fann | 219/497 |
| 3,975,620 | 8/1976 | Hallgreen et al. | 219/364 |

FOREIGN PATENT DOCUMENTS

| 1239509 | 4/1967 | Fed. Rep. of Germany | 219/483 |
| 1295160 | 5/1969 | Fed. Rep. of Germany | 219/364 |
| 1953215 | 4/1971 | Fed. Rep. of Germany | 219/364 |
| 2044934 | 3/1972 | Fed. Rep. of Germany | 219/364 |
| 2145614 | 3/1973 | Fed. Rep. of Germany | 219/364 |
| 2231096 | 1/1974 | Fed. Rep. of Germany | 219/364 |
| 2239085 | 2/1974 | Fed. Rep. of Germany | 219/364 |
| 2428723 | 1/1976 | Fed. Rep. of Germany | 219/364 |
| 2604368 | 8/1976 | Fed. Rep. of Germany | 219/364 |
| 2262261 | 9/1975 | France | 219/364 |
| 1082102 | 9/1967 | United Kingdom | 219/364 |
| 1146256 | 3/1969 | United Kingdom | 219/364 |
| 1228722 | 4/1971 | United Kingdom | 219/364 |
| 1239820 | 7/1971 | United Kingdom | 219/364 |
| 1261649 | 1/1972 | United Kingdom | 219/364 |
| 1276014 | 6/1972 | United Kingdom | 219/364 |
| 1277589 | 6/1972 | United Kingdom | 219/364 |

OTHER PUBLICATIONS

Matys, New Control and Installation Techniques for Space Heating, VDE Fachkes (Germany), vol. 26, 1970.

Primary Examiner—E. A. Goldberg
Assistant Examiner—Bernard Roskoski
Attorney, Agent, or Firm—Merriam, Marshall & Bicknell

[57] ABSTRACT

A heating device having a thermal store provided with an electrical heater has said heater controlled by a charge control circuit which includes a programme generator delivering an output signal in the form of a programme corresponding to a load balancing condition and includes a state of charge sensor which delivers a state of charge signal compared with the programme in a comparator. The heater for the store comprises a plurality of heating elements, the number of which brought into operation to charge the store is controlled by a weather signal provided by an outside temperature sensor. Preferably the comparator provides a delay from the beginning of the off-peak period before energization of the heater starts.

2 Claims, 6 Drawing Figures

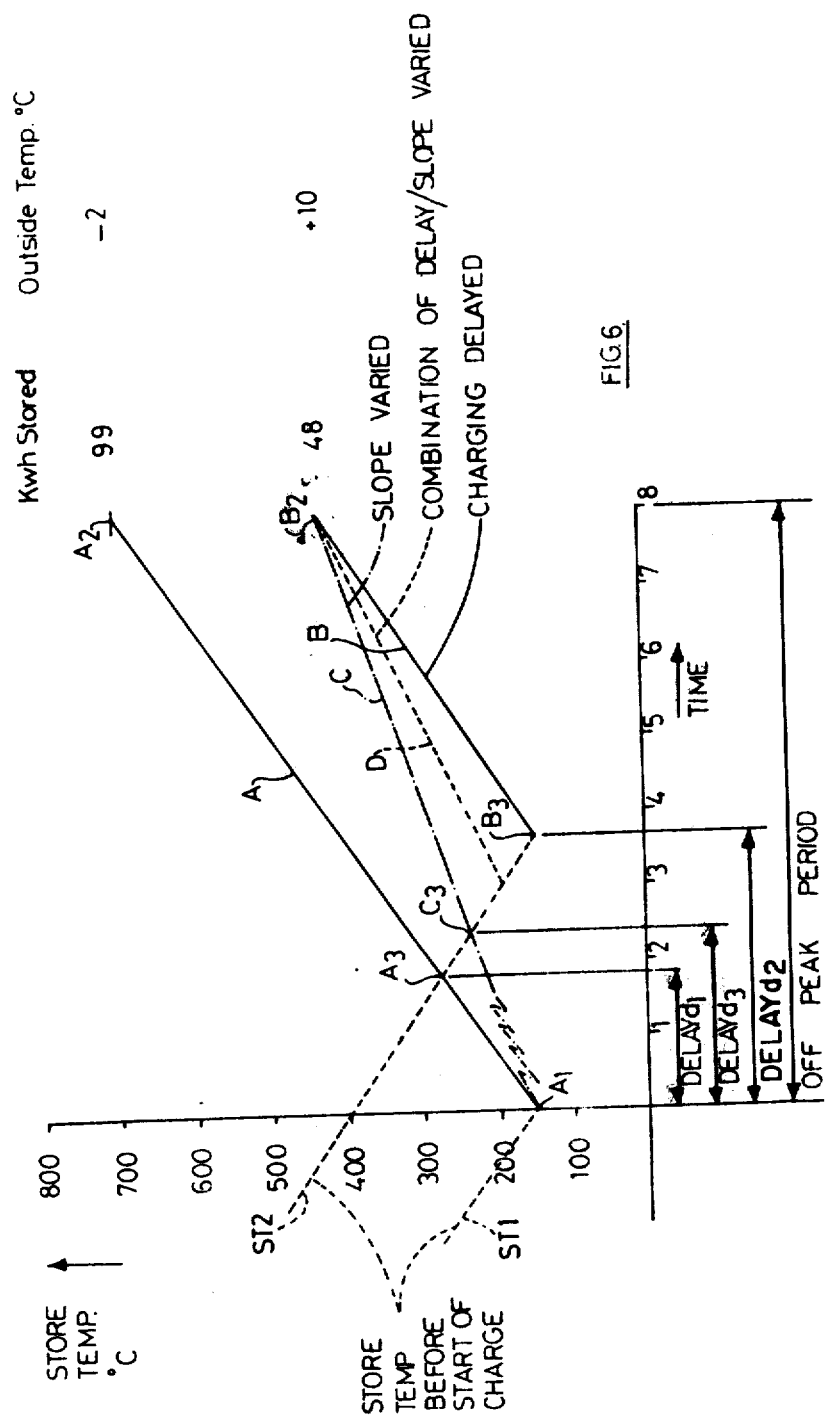

CONTROL SYSTEMS FOR OR IN ASSOCIATION WITH STORAGE HEATERS

BACKGROUND OF THE INVENTION

This invention relates to a control system for or in association with a heater (herein referred to as being of the kind specified) comprising an electrical heating means, and a mass of material, herein called the store, in thermal communication with the heating means.

The primary application of the invention is to space heaters and in this case such heater additionally includes means for establishing the flow of a heat distributing fluid for transferring heat from the store to the place to be heated. When the store comprises a body of solid state material or a liquid material which remains in a container the heat distributing fluid may be air which is brought into contact with the store and thereafter caused or permitted to flow to a place at which heat is required to be furnished. Some forms of space heater include water as the heat store medium and in such cases this water may also act as the heat distributing fluid by being caused or permitted to circulate through radiators in the space to be heated.

The invention may, however, be applied to water heaters for producing a supply of heated water for consumption. In this case the store comprises the quantity of water which is stored temporarily in a tank, usually enclosed partly or wholly by thermal insulating material, the heated water being conveyed in pipes to one or more points of consumption as required.

Energisation of the store by its electrical heating means is normally confined to current drawn from a source which is rendered live for one or more limited periods of time during a basic time interval of 24 hours. Such source is normally rendered live during periods when the demand on a mains electrical supply as a whole is lower than at other times, such limited periods being called, and herein referred to as, off-peak periods. Output terminals of such a source are rendered live by closure of contacts automatically, and not under the control of the user, for example by being enclosed in a locked or sealed housing such as a supply meter housing to which only the generating company or organisation has access.

One of such off-peak periods which is frequently utilised extends from 23.00 to 07.00 hours and in some cases a second off-peak period is provided extending from 13.00 to 15.00 hours.

Although the overall load on the mains electricity supply system is almost invariably lower during at least the main night-time off-peak period, that is from 23.00 to 07.00 hours, this overall load can still be quite high during the early part of the night-time off-peak period and in fact typically does not reduce to a level of about 50% of the normal day-time peak load until 03.00 hours or thereabouts.

SUMMARY OF THE INVENTION

The object of the present invention is to provide a new or improved control system for or in association with a heater of the kind specified which takes into account the fact that the state of charge of the store may not have fallen to a value that requires electrical heating means to be energised for the full off-peak period, or energised at the full power dissipation of which it is capable throughout such period, and thereby allow the load on the electricity supply system to be reduced over the interval or intervals of time during the off-peak period for which this load tends to be high, so that the overall load characteristic for the area in which such heaters are in use is flattened.

According to the invention we provide in a heater having a thermal store, means for establishing flow of a heat distributing fluid into contact with said store and thereafter to a place at which heat is required to be furnished, means for charging said store during an electricity supply off-peak period comprising electrical heating means in thermal communication with said store, and a control circuit for controlling electrical energisation of the heating means during said period, the improvement wherein:

a. said electrical heating means comprises a plurality of heating elements each in thermal communication with said store, b. said circuit comprises:

i. sensing means for sensing a parameter representative of the state of charge of said store and providing a state of charge electrical signal, ii. further sensing means for sensing external temperature and providing a weather state electrical signal, iii. solid state semi-conductor charge controller means connected to said sensing means and to said further sensing means and including, a plurality of output terminals, said charge controller means comprising programming means for initiating charging at a predetermined time in said period in response to the magnitude of said state of charge signal and comparator means responsive to a predetermined magnitude relation between said state of charge signal and said weather signal to establish a charge control signal and to determine the number of said output terminals carrying said charge control signal, iv. a plurality of current controlling means connected between respective ones of said output terminals and respective ones of said heating elements and responsive to the incidence of said charge control signal at each of said terminals whereby the number of said heating elements energised during said off-peak period is determined by said weather state signal.

For a typical off-peak night-time period starting at 23.00 and running until 07.00, the level of the overall electricity supply load may decrease (linearly or otherwise) from the beginning of this off-peak period to a time near, but not at, the end of the period, typically 04.00 or 05.00 and may then rise at the end of the period, e.g. at 07.00, but is still at that time well below the level existing at the beginning of the off-peak period.

In such a case a suitable programming means would be one developing a programming signal which varies in the opposite sense throughout the off-peak period. Such programming signal may either increase or decrease, for example linearly or approximately so, depending upon the load flattening requirements. The state of charge signal developing in response to falling temperature would then be required to decrease or increase to provide a point of intersection between the graphs of these two signals plotted against time to bring the current controlling means into operation to start current flow through the heating means.

In the usual case where the current drawn from the off-peak source is cut-off (or reduced) from the beginning of the off-peak period, the sensing means would be arranged to sense the state of charge at least at a time at, or near, the beginning of this period and preferably continuously or at intervals of time throughout the off-peak period.

BRIEF DESCRIPTION OF THE DRAWINGS

The invention will now be described, by way of example, with reference to the accompanying drawings wherein:

FIG. 6 is a graph in which temperature is plotted as abscissa against time for store temperature preparatory to charge and the programme set (and hence the store temperature characteristic achieved) during the charging period.

DESCRIPTION OF THE PREFERRED EMBODIMENT

Figure 1:
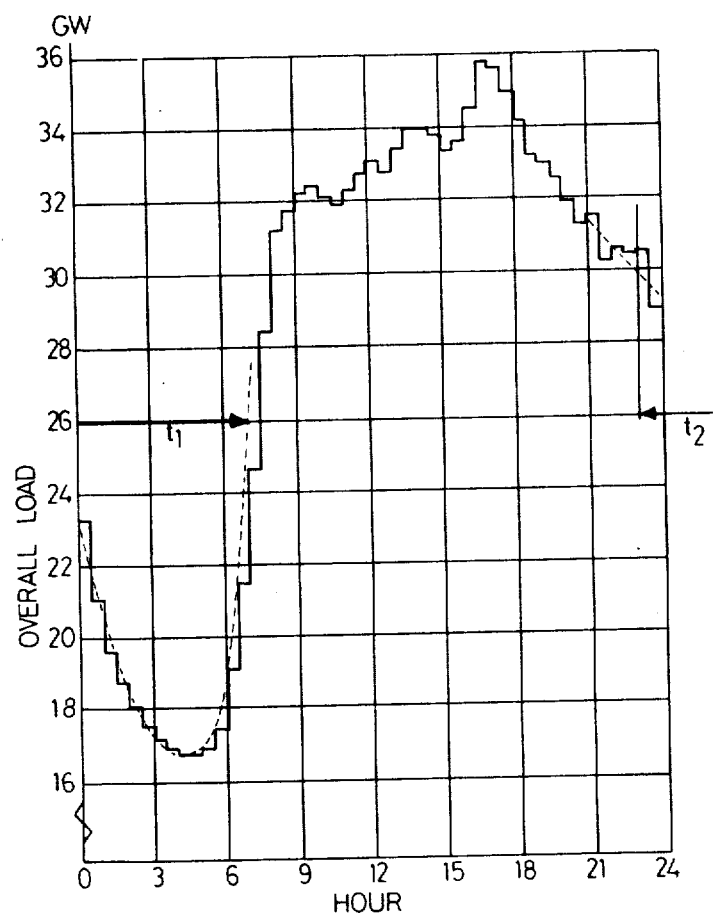
FIG. 1 is a graph in which the overall load for a typical electricity supply system is plotted against time for a basic period of 24 hours.

In FIG. 1 the periods indicated at t1, t2 collectively form an off-peak night-time period extending typically from 23.00 to 07.00 hours and stepped curve represents the overall load on a typical electricity supply system recorded over successive half-hour periods throughout a basic period of 24 hours.

It will be noted that while, during the off-peak period, the load has fallen to a value which is approximately 50% of its day-time peak value for a time interval running from approximately 02.30 to 05.30, it is higher than this value for the remainder of the off-peak period, and more especially for the time interval between 23.00 and 02.00.

The embodiments of the apparatus herein described in accordance with the invention at least reduce and, in some cases, eliminate the application of load to the electricity supply system during a selected part of the off-peak charging period, for example between 23.00 and 02.00, the particular characteristic achieved being dependent partly on store temperature at the beginning of the off-peak period and partly on atmospheric temperature outside the building in which the heater is used.

For store materials typically in use the temperature range between the fully discharged and fully charged states is typically 150° C. to 725° C., the lower limit being determined primarily by the lowest temperature at which useful heat can be supplied to the space to be heated, and the upper limit by factors such as ability of the store material and associated constructional and electrical parts of the heater to withstand the upper temperature over a satisfactory service life. In FIG. 6 for simplicity, the curves are shown as straight lines which is a reasonable approximation for illustrating the characteristics of the various embodiments of the invention but in practice it will be understood that there will be some departure from linearity.

Assuming that, before the beginning of the off-peak charging period, the store temperature characteristic had been represented by the curve ST1, it would have reached the minimum temperature 150° C. and accordingly the programming means (hereinafter described) would require to set a programme represented by curve A also illustrating the temperature rise characteristic of the store starting at the point A1 and finishing at the point A2. If, one the other hand, the cooling characteristic of the store had been represented by the curve ST2 then in order to achieve the required temperature at the point A2 the store would require to be energised only from the point of intersection A3 of curves ST2 and A, and, therefore, there would be a delay d1 from the beginning of the off-peak period to the start of charging the store, thereby relieving the overall load on the electricity supply system during the more heavily loaded early part of the off-peak period.

Store charging to reach point A2, i.e. in accordance with the characteristic A, is appropriate where the outside temperature is relatively low, for example $-2°$ C., but if the outside temperature were higher, for example $10°$ C., then an adequate charge for the store (estimated to meet heating requirements during the following day-time period) would typically be represented by the point B2. There are a number of possible ways of achieving a store charge represented by B2 each of which provides some amelioration of the problem of relatively heavy overall loading of the electricity supply during the early part of the off-peak period.

Thus, if an electrical heating means in thermal communication with the store were continuously energised at its full current rating, the store would achieve the temperature represented by the point B2 by following the curve B. This curve is necessarily parallel to the curve A since the rate of rise of temperature of the store is dependent to a close approximation upon the power dissipation of the heating means. The start of the charging period would be represented by the point B3 where the curves ST2 and B intersect. Charging would thus be delayed by a greater amount d2 as shown. Alternatively, however, charging of the store may be arranged to take place at a lower power dissipation in accordance with a programme, and hence temperature rise characteristic, represented by the curve C joining points A1 and B2. This curve C represents the rate of temperature rise which have to be attained to reach the point B2 were the store temperature at the minimum value of 150° C. (point A1) at the beginning of the off-peak period. However, were the store temperature at this time to be determined by the curve ST2 charging would start at the point C3, and there would evidently be both a delay d3, and thereafter a reduction in the mean current drawn from the electricity supply, so that again benefit is achieved by having complete elimination of loading for the delay period d3 and thereafter a reduction in the loading throughout the remaining part of the off-peak period.

Evidently any selected characteristic, as represented by the curve D, could be presented by the programming means providing a different combination of delay and reduction in mean current drawn from the supply providing a rate of temperature rise intermediate those represented by curves C and B.

Figure 2:
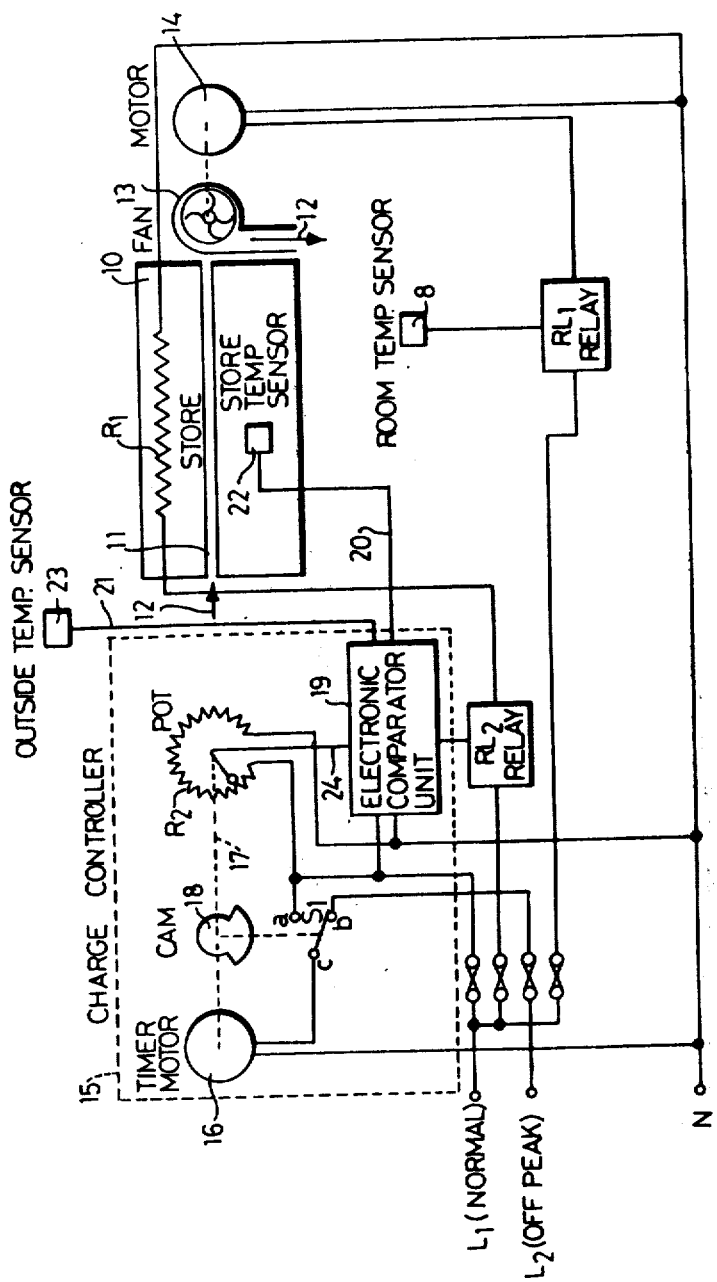
FIG. 2 shows one embodiment of a control system in accordance with the invention in which the programming means comprises an electrical potentiometer driven by a timer motor and a comparator.

Referring now to the embodiment shown in FIG. 2, the heater comprises a store 10 of any suitable material having an air passageway system 11 through which air flow represented by arrows 12 can be brought about by a fan 13 driven from a motor 14. The motor 14 is energised from the normal terminals L1, N of the electricity supply which are live throughout the basic 24 hour period, current to the motor being controlled by a relay RL1 responsive to room temperature sensor 8 so that the fan is brought into operation only when heat is required to be supplied to the space to be heated.

Heating means for the core comprises a resistive heating element R1. It will be understood that both the heating element R1 and the passageway system 9 through the store 10, are distributed appropriately to achieve substantially uniform delivery of heat to the core and abstraction of heat from the core respectively.

Current for the heating element R1 is derived from the supply at terminals L1, N, via a current controlling means comprising a relay RL2. Current to close the relay RL2 is derived from terminals L2, N which are rendered live only during the off-peak period by a switch means which is under the control of the generating authority or company and not the user, by reason of being locked or sealed in an electricity meter housing or other enclosure as appropriate.

A charge controller means enclosed in the boundary 15 comprises a timing means in the form of a timer motor 16 which drives, through a mechanical connection 17, a cam 18 controlling a change-over switch S1 and the slider of a potentiometer R2 forming a programming means. The charge controller means further comprises an electronic comparator circuit or unit, 19, which receives electrical inputs from conductors 20 and 21 connected respectively to sensors 22 and 23 respectively sensing store temperature and air temperature outside the building containing the room space to be heated.

At the beginning of an off-peak period contacts b, c are connected in the change-over switch S1 and the timer motor is energised from the off-peak supply and drives the cam 18 and slider of potentiometer R2 so that the latter supplies a voltage representing a programmin signal to the comparator 19 and which increases or decreases linearly, or in accordance with some other preselected characteristic determined by the distribution of the winding of the potentiometer R2 on its former.

A further signal representative of the state of charge of the store is fed from the sensor 22 along conductor 20 to the comparator unit and the latter comprises a circuit which responds to coincidence, or some other desired relationship, between these two signals to energise relay RL2 and establish a supply of current from the terminal L1 through heating element R1.

It will be understood that if the store temperature (i.e. state of charge) signal falls linearly or in some other manner then the programming means would present a signal which rises linearly or in some appropriate manner so as to provide the required coincidence or relationship at a predetermined time as the state of charge signal is compared with the programming signal. The nature of the sensor may, however, be such as to provide a rising signal in response to fall of temperature in which case a falling programming signal would be required from the potentiometer slider R2.

Additionally, the comparator circuit receives a weather signal representative of outside temperature from sensor 23 along conductor 21. The comparator circuit may be such that the effect of a weather signal representing increased outside temperature produces a delay in the onset of charging as represented typically by point B3 in FIG. 6. Alternatively, the weather signal may reduce the slope of the characteristic produced as represented typically by curve C, or the weather signal may produce both a delay and a reduction of slope as shown typically in curve D, FIG. 6.

At some time during the off-peak period the cam 18 results in change-over of the switch S1 to close contacts a, c and energise the motor 16 from the normal (continuous) supply (terminals L1, N). This allows the motor to continue to drive the slider of the potentiometer R2 after the end of the off-peak period so that it arrives back at its starting position at the beginning of the winding. When the slider arrives at this position, which will be achieved after the end of the off-peak period, the cam 18 restores the switch S1 to the position shown, i.e. contacts c, b closed so that the motor, cam and potentiometer slider are then brought to rest ready for the onset of the next off-peak period.

Figure 3:
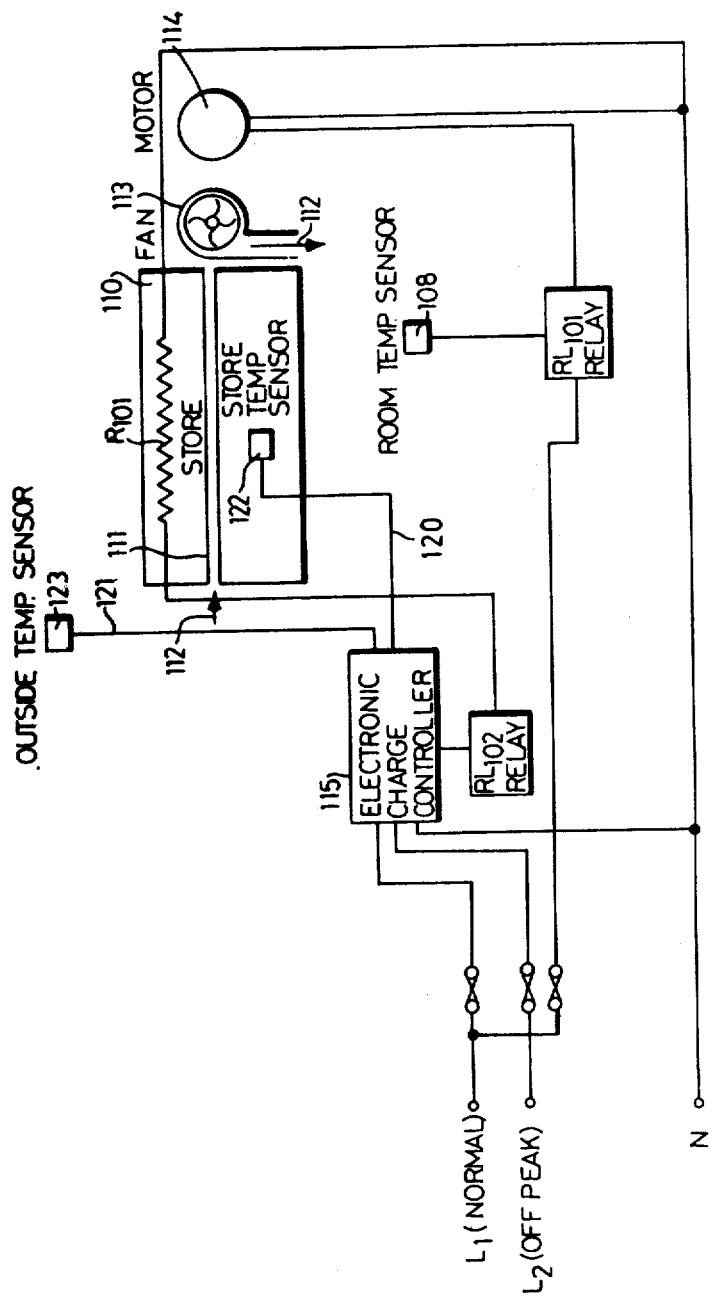
FIG. 3 shows a further embodiment in which the programming means comprises a solid state semi-conductor circuit in which a variation of the programme in response to outside temperature can be effected by imposing a variable delay before charging of the store starts, or by varying the value of the charging current (and hence the slope of the temperature rise characteristic of the core during charging)

In the embodiment shown in FIG. 3 parts corresponding to those of FIG. 2 are designated by like references with the prefix 100 and the preceding description is to be deemed to apply.

In this embodiment the functions carried out by the timer motor 16 and its associated change-over switch S1 and cam 18 and the potentiometer R2 and comparator unit 19 are all embodied in a single solid state semi-conductor circuit 115. The principle of operation is, however, the same as that in the embodiment of FIG. 2. Thus, the circuit 115 may include a timing circuit functionally equivalent to the timer motor 16 and a circuit functionally equivalent to potentiometer R2 which together provide an output representing the programme required, e.g. conforming to any one of curves A, B, C or D of FIG. 6, and which is fed to a comparator circuit also receiving the state of charge signal from sensor 122 and a weather signal representative of outside temperature from sensor 123 to bring about a delay and/or change of slope in response to receipt of these signals.

Figure 4:
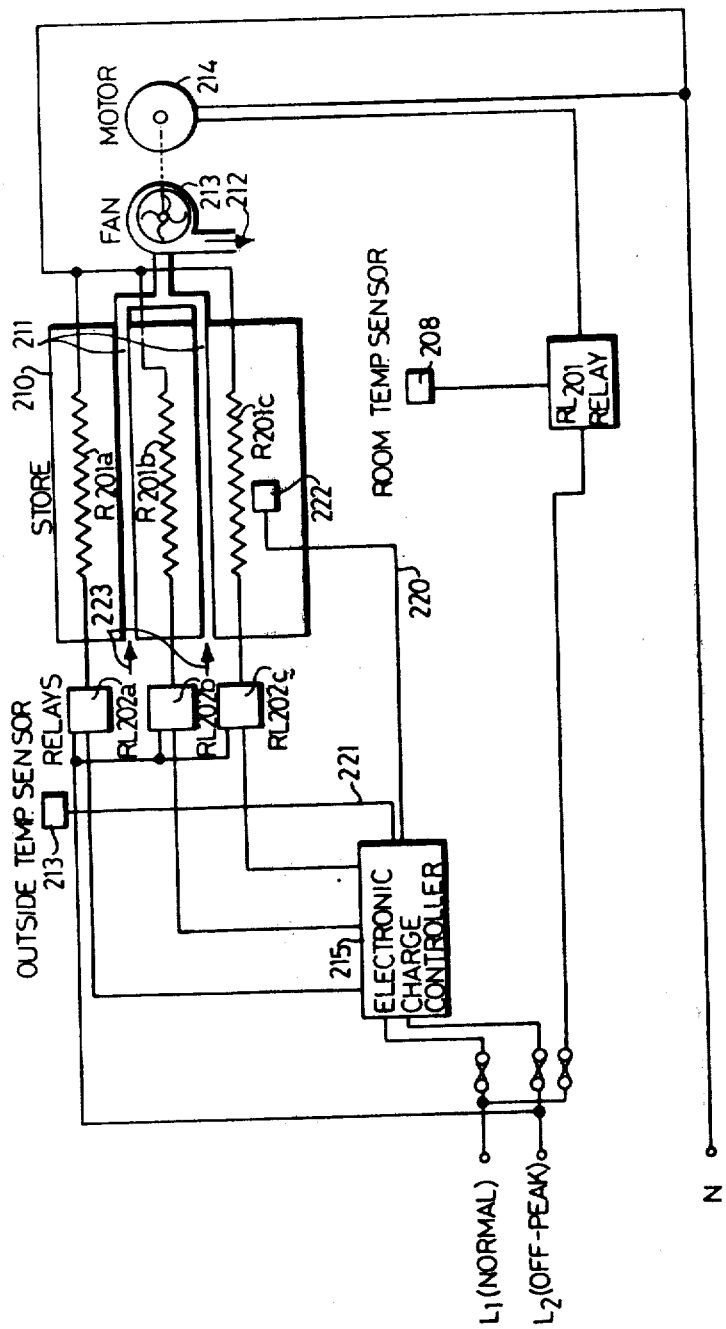
FIG. 4 shows an embodiment of simple form in which the slope of the charging characteristic can be varied in steps in response to changes in outside temperature.

A particularly simple embodiment of the invention is shown in FIG. 4 in which parts corresponding to those already described are designated by like references with the prefix 200, the preceding description being deemed to apply to these. In this embodiment a plurality of heating elements R201a, R201b, R201c are provided for heating the store, current to these being controlled by current controlling means comprising relays RL202a to RL202c connected to respective output terminals of the charge controller. According to the magnitude of the weather signal representative of outside temperature provided from the sensor 213, the charge controller means 215 furnishes charge controller output signals to energise one, two or all of the relays, thereby selecting the slope of the charging curve, while the state of charge signal from sensor 222 effectively represented by curves such as ST1, ST2, FIG. 6, etermines the delay which occurs between the beginning of the off-peak period at the time at which charging starts.

Figure 5:
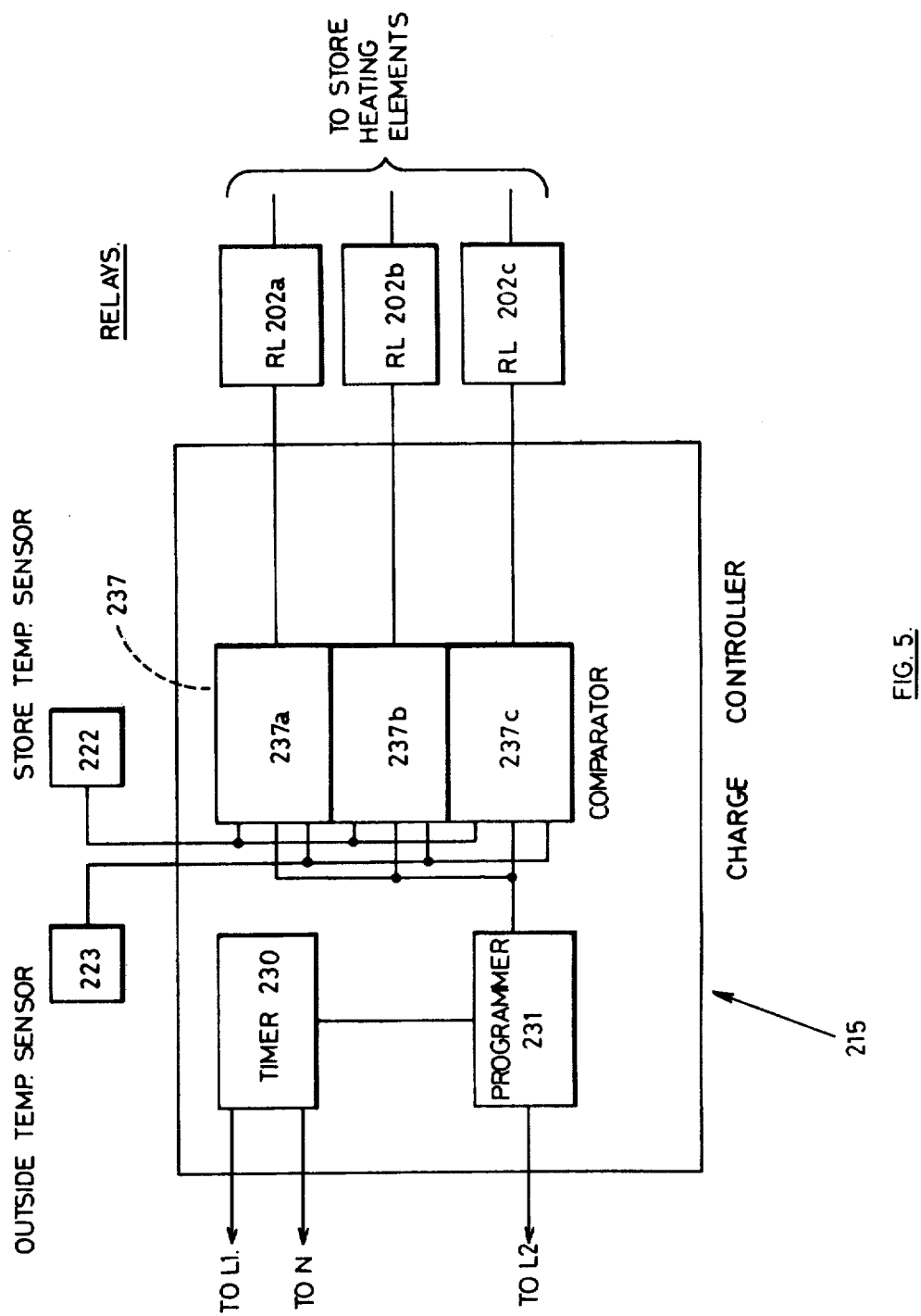
FIG. 5 is a fragmentary schematic circuit diagram illustrating one arrangement of charge control means capable of utilisation in the embodiment of FIG. 4 to provide variable slope characteristics for the charging programme.

FIG. 5 illustrates one form of charge controller circuit 115 which may be employed in the embodiment of FIG. 4.

This comprises a timer circuit 230 and programmer circuit 232 providing inputs to three sections 237a, 237b, 237c of a comparator circuit 237. Further inputs are provided to the comparator circuit 237 from the state of charge sensor 222 of the store and from the weather sensor 223, the latter determining the response points for respective comparator sections so that charge control output signals are fed to relays one, two or all of relays RL202a, RL202b, RL202c as the weather signal varies between a high temperature and low temperature value.

Furthermore, although in the embodiments described the store sensor 122 provides a state of charge signal which varies the delay before the onset of charging current, such signal could, as in the case of the signal from the sensor 123, be utilised to vary the slope of the charging characteristic. It will be understood that, as indicated diagrammatically in the lower part of curve C (FIG. 6), the operation of the comparator will ensure switching on and switching off of the charging current by the relays RL102, RL202a to RL202c whenever the store temperature rises above the selected curve C or D, the extent of the cycling being dependent upon the sensitivity of the comparator circuit.

We claim:

1. In a heater having a thermal store, means for establishing flow of a heat distributing fluid into contact with said store and thereafter to a place at which heat is required to be furnished, means for charging said store during an electricity supply off-peak period comprising electrical heating means in thermal communication with said store, and a control circuit for controlling electrical energisation of the heating means during said period, the improvement wherein:

a. said electrical heating means comprises a plurality of heating elements each in thermal communication with said store,
   b. said circuit comprises:
      i. sensing means for sensing a parameter representative of the state of charge of said store and providing a state of charge electrical signal,
      ii. further sensing means for sensing external temperature and providing a weather state electrical signal,
      iii. solid state semi-conductor charge controller means connected to said sensing means and to said further sensing means and including, a plurality of output terminals, said charge controller means comprising programming means for initiating charging at a predetermined time in said period in response to the magnitude of said state of charge signal and comparator means responsive to a predetermined magnitude relation between said state of charge signal and said weather signal to establish a charge control signal and to determine the number of said output terminals carrying said charge control signal,
      iv. a plurality of current controlling means connected between respective ones of said output terminals and respective ones of said heating elements and responsive to the incidence of said charge control signal at each of said terminals whereby the number of said heating elements energised during said off-peak period is determined by said weather state signal.

2. The improvement according to claim 1 wherein said charge controller means is responsive to the magnitude of said state of charge signal to provide a variable delay from the beginning of said off-peak period to establishment of the charge control signal at any one of said terminals.

* * * * *